(12) United States Patent
Fukuda et al.

(10) Patent No.: US 9,937,988 B2
(45) Date of Patent: *Apr. 10, 2018

(54) OUTBOARD MOTOR POWER GENERATION SYSTEM AND OUTBOARD MOTOR

(71) Applicant: YAMAHA HATSUDOKI KABUSHIKI KAISHA, Iwata-shi, Shizuoka-ken (JP)

(72) Inventors: Shiro Fukuda, Iwata (JP); Hideki Furuta, Iwata (JP); Jun Noguchi, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 39 days.

This patent is subject to a terminal disclaimer.

(21) Appl. No.: 15/182,006

(22) Filed: Jun. 14, 2016

(65) Prior Publication Data

US 2017/0012488 A1    Jan. 12, 2017

(30) Foreign Application Priority Data

Jul. 6, 2015 (JP) .................................. 2015-135383

(51) Int. Cl.
*B63H 20/32* (2006.01)
*B63H 20/00* (2006.01)
*H02H 7/18* (2006.01)

(52) U.S. Cl.
CPC ............... *B63H 20/00* (2013.01); *H02H 7/18* (2013.01); *H01M 2220/20* (2013.01)

(58) Field of Classification Search
CPC .................................. B63H 20/00; H02H 7/18
See application file for complete search history.

(56) References Cited

U.S. PATENT DOCUMENTS

| | | | | |
|---|---|---|---|---|
| 3,421,069 A | * | 1/1969 | Minks | F02P 3/0884 123/597 |
| 5,657,257 A | * | 8/1997 | Lee | G06F 1/26 713/321 |
| 6,000,829 A | * | 12/1999 | Kurokawa | H03K 19/00384 327/121 |
| 6,198,262 B1 | * | 3/2001 | Squibb | G05F 1/575 323/273 |
| 6,204,701 B1 | * | 3/2001 | Tsay | H03K 17/223 327/143 |
| 9,745,039 B2 | * | 8/2017 | Noguchi | B63J 3/02 |
| 2016/0218518 A1 | * | 7/2016 | Fukuda | H02J 5/00 |

FOREIGN PATENT DOCUMENTS

JP    2001-128388 A    5/2001

* cited by examiner

*Primary Examiner* — Stephen P Avila
(74) *Attorney, Agent, or Firm* — Rabin & Berdo, P.C.

(57) ABSTRACT

An outboard motor power generation system includes an engine, a power generator, a converting device configured to convert alternating-current power into direct-current power, an engine cover configured to cover the engine, the power generator, and the converting device, a battery, and a transformer provided on an electric pathway between the converting device and the battery and configured to raise the voltage of the direct-current power output from the converting device relative to the charge voltage of the battery.

15 Claims, 6 Drawing Sheets

FIRST EMBODIMENT

SECOND EMBODIMENT

PHASE CONTROL (FIELD CONTROL)

THIRD EMBODIMENT

OUTBOARD MOTOR POWER GENERATION SYSTEM AND OUTBOARD MOTOR

CROSS-REFERENCE TO RELATED APPLICATION

The priority application number JP2015-135383, entitled "Outboard Motor Power Generation System and Outboard Motor", and filed Jul. 6, 2015, by Shiro Fukuda, Hideki Furuta, and Jun Noguchi, upon which this patent application is based, is hereby incorporated by reference in its entirety.

BACKGROUND OF THE INVENTION

Field of the Invention

The present invention relates to an outboard motor power generation system and an outboard motor.

Description of the Background Art

An outboard motor power generation system is known in general. Such an outboard motor power generation system is disclosed in Japanese Patent Laying-Open No. 2001-128388, for example.

The aforementioned Japanese Patent Laying-Open No. 2001-128388 discloses a charging system (outboard motor power generation system) for a small boat including an engine, a power generator driven by the rotation of the engine, a rectifier that converts alternating-current power output from the power generator into direct-current power, and a battery charged with the electric power converted by the rectifier.

In the charging system for a small boat according to the aforementioned Japanese Patent Laying-Open No. 2001-128388, the induced voltage of the power generator is raised when the number of rotations (rotational speed) of the engine is high, and hence the power generation amount can be increased. When the number of rotations of the engine is low, on the other hand, the induced voltage of the power generator is not raised, and hence it is difficult to increase the power generation amount. In general, an outboard motor power generation system and an outboard motor each capable of increasing the power generation amount even when the number of rotations of the engine is low are desired.

SUMMARY OF THE INVENTION

Embodiments of the present application provide an outboard motor power generation system and an outboard motor each capable of increasing the power generation amount even when the rotational speed of an engine is low.

An outboard motor power generation system according to a first aspect of the present invention includes an engine including a crankshaft, a power generator including a stator and a rotor driven by the crankshaft, a converting device configured to convert alternating-current power output from the power generator into direct-current power and outputs the direct-current power, an engine cover configured to cover the engine, the power generator, and the converting device, a battery arranged outside the engine cover and capable of being charged with electric power converted and supplied by the converting device, the battery is connected to the converting device through an electric pathway and the battery has a charge voltage at which the battery is chargeable and a transformer provided on the electric pathway, and configured to raise the voltage of the direct-current power output from the converting device so that the voltage of the direct-current power output from the converting device becomes high relative to the charge voltage of the battery.

As hereinabove described, the outboard motor power generation system according to the first aspect is provided with the transformer arranged on the electric pathway between the converting device and the battery and configured to raise the voltage of the direct-current power output from the converting device relative to the charge voltage of the battery. Thus, the voltage of the direct-current power output from the converting device can be raised, and hence electric power capable of being drawn from the power generator can be increased. Consequently, even when the rotational speed of the engine is low, the power generation amount can be increased. Also when the rotational speed of the engine is high, the voltage of the direct-current power output from the converting device can be raised, and hence the power generation amount can be further increased.

The aforementioned outboard motor power generation system according to the first aspect preferably further includes a controller configured to control the transformer according to the rotational speed of the engine so as to control the voltage of the direct-current power output from the converting device. According to this structure, the voltage of the direct-current power output from the converting device can be raised such that the power generation amount is maximized according to the rotational speed of the engine, and hence the power generation amount can be effectively increased.

In the aforementioned outboard motor power generation system according to the first aspect, the transformer is preferably arranged inside the engine cover. According to this structure, the transformer is arranged inside the engine cover such that an outboard motor has a compact structure.

In the aforementioned outboard motor power generation system according to the first aspect, the battery preferably includes an engine battery and an accessory battery, the electric pathway is preferably branched downstream from the transformer, and the direct-current power output from the transformer is preferably supplied to each of the engine battery and the accessory battery through the branched electric pathway. According to this structure, the electric power can be supplied to an accessory provided in a boat by the accessory battery, and the engine can be driven by the engine battery provided separately from the accessory battery. Furthermore, according to the present invention, even when the power consumption of the accessory battery is increased with an increase in the size of the boat, the power generation amount can be increased, and hence the operation of the accessory is not obstructed.

In the aforementioned outboard motor power generation system according to the first aspect, the converting device preferably includes a regulator rectifier. According to this structure, the alternating-current power generated by the power generator can be converted into the direct-current power by the regulator rectifier.

In the aforementioned outboard motor power generation system according to the first aspect, the converting device preferably includes a plurality of switching elements, the converting device is preferably configured to control the power generator, and the outboard motor power generation system further comprises a controller configured to preferably control the transformer such that the voltage of the direct-current power output from the converting device is controlled. According to this structure, field control of the power generator is performed so that the voltage of the direct-current power output from the converting device can be efficiently raised. Furthermore, the transformer raises the voltage of the direct-current power output from the converting device so that the power generation amount can be efficiently increased with an increase in the voltage due to the field control.

In this case, the controller is configured to preferably control the power generator to generate the alternating-current power while the controller controls where the converting device to control the power generator in a field-strengthening direction. According to this structure, field-strengthening control is performed such that interlinkage magnetic flux can be reinforced by field magnetic flux, and hence the power generation amount can be increased even when the rotational speed of the engine is low.

In the aforementioned structure in which the converting device includes the plurality of switching elements, the controller controls field control of the power generator and voltage control, each of which generates a predetermined power generation amount, the voltage control including controlling the raising the voltage of the direct-current power output from the converting device by the transformer, the controller preferably prioritizing the voltage control over the field control. According to this structure, when the voltage control and the field control are combined, the voltage control of raising the voltage without an increase in coil current is prioritized over the field control involving the increase in coil current such that an excessive increase in coil current can be significantly reduced or prevented. Thus, the power generation amount can be increased while heat generation of the power generator due to the increase in coil current is significantly reduced or prevented.

In the aforementioned structure in which the converting device includes the plurality of switching elements, the controller is preferably configured to control the converting device to control power generation by the power generator in a field-weakening direction when a reduction in power generation of the power generator is required. According to this structure, an excessive increase in coil current following the field control in the field-strengthening direction can be significantly reduced or prevented, and hence heat generation of the power generator due to an increase in coil current can be significantly reduced or prevented.

In the aforementioned outboard motor power generation system according to the first aspect, a controller is provided and is preferably configured to control the voltage of the direct-current power output from the converting device so as to be variable with respect to the induced voltage of the power generator. According to this structure, the voltage of the direct-current power output from the converting device can be raised such that the power generation amount is maximized according to the induced voltage, and hence the power generation amount can be effectively increased.

In the aforementioned structure in which the voltage of the direct-current power output from the converting device is controlled so as to be variable with respect to the induced voltage of the power generator, the controller is preferably configured to control the voltage of the direct-current power output from the converting device so as to be raised relative to the induced voltage of the power generator as the rotational speed of the engine is increased. According to this structure, the voltage of the direct-current power output from the converting device is raised according to the rotational speed of the engine so that the power generation amount can be effectively increased.

In this case, the controller is preferably configured to control the voltage of the direct-current power output from the converting device such that a ratio of the voltage of the direct-current power output from the converting device to the induced voltage of the power generator is increased as the rotational speed of the engine is increased. According to this structure, the power generation amount can be more effectively increased in a region where the rotational speed of the engine is high.

An outboard motor according to a second aspect of the present invention includes an engine including a crankshaft, a power generator including a stator and a rotor driven by the crankshaft, a converting device configured to convert alternating-current power output from the power generator into direct-current power and including a plurality of switching elements, the converting device further being capable of performing phase control, an engine cover configured to cover the engine, the power generator, and the converting device. The outboard motor further includes a controller configured to control the converting device to perform the phase control of the power generator in a field-strengthening direction so as to control power generation.

In the outboard motor according to the second aspect, as hereinabove described, the converting device is configured to perform the phase control of the power generator in the field-strengthening direction so as to control power generation. Thus, field-strengthening control is performed such that interlinkage magnetic flux can be reinforced by field magnetic flux, and hence the power generation amount can be increased even when the rotational speed of the engine is low. Also when the rotational speed of the engine is high, the power generation amount can be further increased by the field-strengthening control.

In the aforementioned outboard motor according to the second aspect, the rotor includes a flywheel connected to the crankshaft. According to this structure, the number of components can be reduced as compared with the case where the rotor and the flywheel are provided separately from each other.

In this case, the rotor is preferably arranged above or below the engine on the axis of the crankshaft. According to this structure, in the engine of the outboard motor, the crankshaft of which extends vertically, the rotation of the crankshaft can be efficiently transmitted to the rotor of the power generator.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment (Structure of Outboard Motor Boat)

The structure of an outboard motor boat 10 according to a first embodiment of the present invention is now described with reference to FIGS. 1 and 2. In the figure, arrow FWD represents the forward movement direction of the outboard motor boat 10, and arrow BWD represents the reverse movement direction of the outboard motor boat 10. Furthermore, in the figure, arrow R represents the starboard direction of the outboard motor boat 10, and arrow L represents the portside direction of the outboard motor boat 10.

Figure 1:
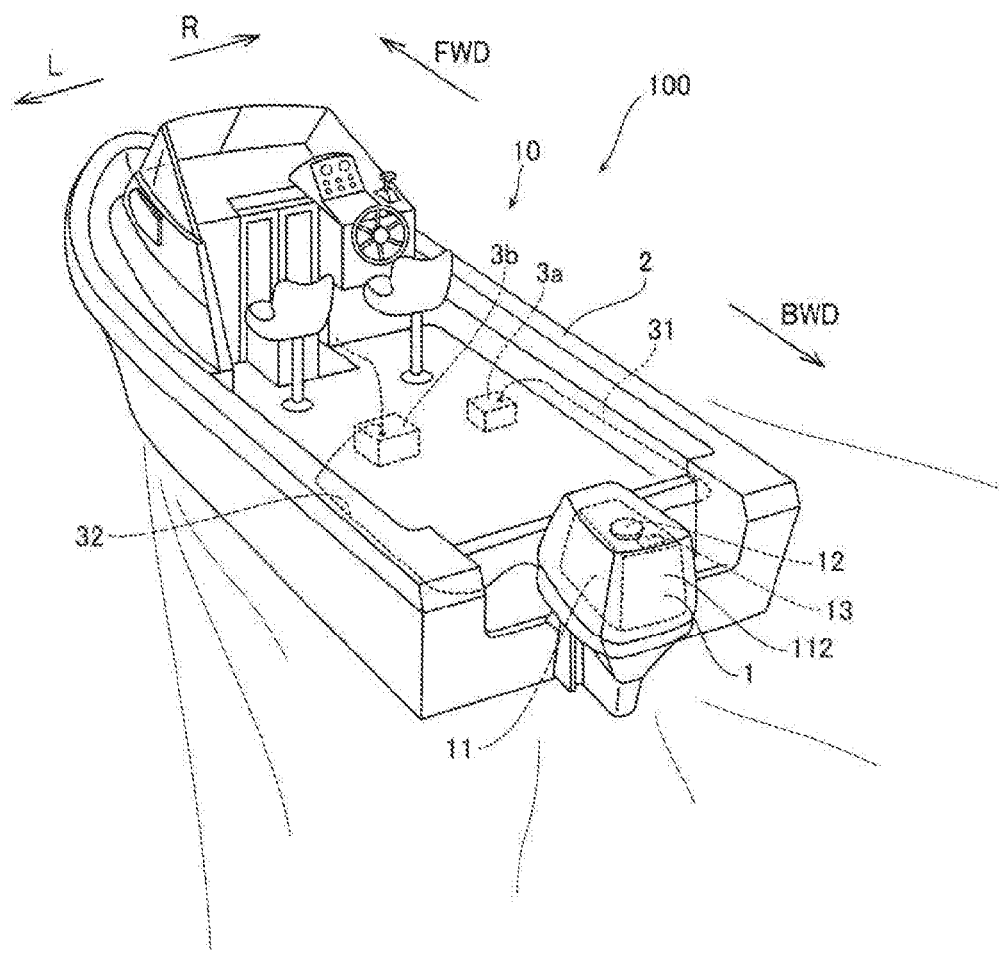
FIG. 1 is a perspective view showing an outboard motor boat including an outboard motor power generation system according to a first embodiment of the present invention.

The outboard motor boat 10 includes an outboard motor 1, a boat body 2, an engine battery 3a, and an accessory battery 3b, as shown in FIG. 1. One outboard motor 1 is provided on a rear portion of the boat body 2. The engine battery 3a is connected to the outboard motor 1 through a cable 31. The accessory battery 3b is connected to the outboard motor 1 through a cable 32. The engine battery 3a and the accessory battery 3b are examples of the "battery" in the claims.

Figure 2:
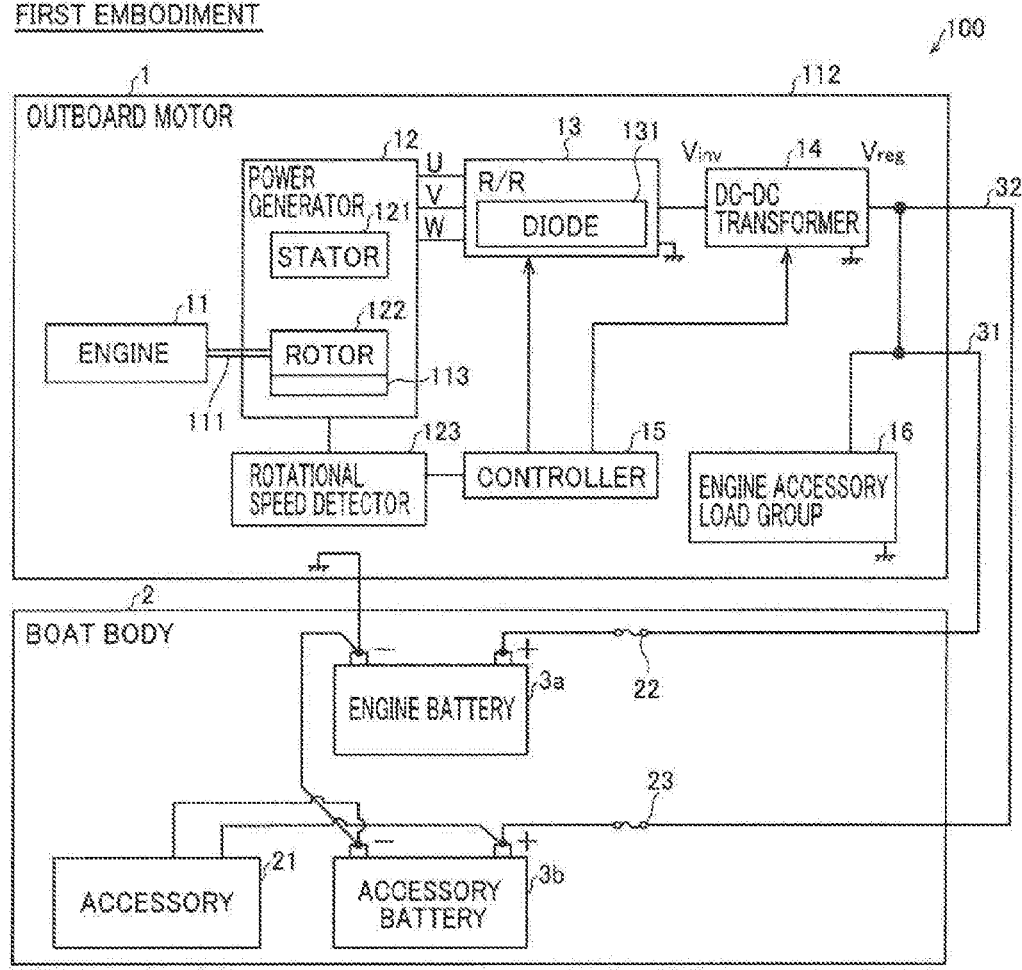
FIG. 2 is a block diagram schematically showing the outboard motor power generation system according to the first embodiment of the present invention.

The outboard motor 1 includes an engine 11, a power generator 12, a regulator rectifier 13, a DC (direct current)-DC transformer 14, a controller 15, and an engine accessory load group 16, as shown in FIG. 2. The engine 11 includes a crankshaft 111, an engine cover 112 (see FIG. 1), and a flywheel 113. The power generator 12 includes a stator 121 and a rotor 122. The power generator 12 is provided with a rotational speed detector 123. The regulator rectifier 13 includes a plurality of diodes 131. The regulator rectifier 13 is an example of the "converting device" in the claims, and the DC-DC transformer 14 is an example of the "transformer" in the claims.

The outboard motor 1 is arranged to extend to below the engine 11 and further includes a drive shaft configured to transmit the drive force of the engine 11, one propeller shaft that extends in a direction orthogonal to (intersecting with) the drive shaft, and one propeller mounted on a rear end portion of the propeller shaft, rotated together with the propeller shaft.

The boat body 2 is provided with an accessory 21 and fuses 22 and 23, as shown in FIG. 2.

An outboard motor power generation system 100 includes the engine 11, the power generator 12, the regulator rectifier 13, the engine cover 112, the engine battery 3a, the accessory battery 3b, and the DC-DC transformer 14. The engine accessory load group 16 includes a starter motor, an injector, an engine control unit (ECU), and a device configured to drive the engine 11 such as a spark plug. The outboard motor power generation system 100 is provided to supply electric power to the outboard motor boat 10. In other words, the outboard motor power generation system 100 generates and stores electric power to be used by the outboard motor boat 10 and supplies the same to the outboard motor boat 10. As shown in FIG. 1, the power generator 12 and the regulator rectifier 13 are mounted on the engine 11. The engine 11, the power generator 12, the regulator rectifier 13, the DC-DC transformer 14, the controller 15, and the engine accessory load group 16 are covered by the engine cover 112.

The engine 11 rotates the crankshaft 111 to rotate the propeller of the outboard motor 1. The rotation of the propeller generates propulsion power, and the boat body 2 moves. The engine 11 rotates the crankshaft 111 to rotate the rotor 122 of the power generator 12. The rotation of the rotor 122 generates electromotive force, and the power generator 12 generates electric power. The engine 11 is powered by fuel such as gasoline or gas oil.

The power generator 12 is arranged above the engine 11, as shown in FIG. 1. The rotor 122 of the power generator 12 is driven by the crankshaft 111 and rotates with respect to the stator 121. As shown in FIG. 2, the power generator 12 generates alternating-current power of three phases (a U phase, a V phase, and a W phase) by the rotation of the rotor 122. The generated alternating-current power of the three phases is output to the regulator rectifier 13. The stator 121 includes a coil. The rotor 122 includes permanent magnets. The rotor 122 is provided integrally with the flywheel 113 connected to the crankshaft 111. The rotor 122 is arranged above the engine 11 on the axis of the crankshaft 111. The rotational speed detector 123 detects the rotational speed (number of rotations) of the rotor 122. The detected rotational speed (number of rotations) is transmitted to the controller 15.

The regulator rectifier 13 converts alternating-current power output from the power generator 12 into direct-current power. Specifically, the regulator rectifier 13 includes the plurality of diodes 131. The alternating-current power of the three phases is converted into the direct-current power by rectification of the plurality of diodes 131.

According to the first embodiment, the DC-DC transformer 14 is provided on an electric pathway between the regulator rectifier 13 and both the engine battery 3a and the accessory battery 3b. The DC-DC transformer 14 transforms the voltage of the direct-current power into another voltage of direct-current power. The DC-DC transformer 14 raises the voltage of the direct-current power output from the regulator rectifier 13 relative to the charge voltage of the batteries (the engine battery 3a and the accessory battery 3b). The charge voltage is a voltage at which the batteries 3a, 3b are chargeable. Specifically, the DC-DC transformer 14 raises (increases) the voltage $V_{inv}$ of the direct-current power to be output from the regulator rectifier 13 so that the voltage $V_{inv}$ of the direct-current power to be output from the regulator rectifier 13 becomes high relative to the charge voltage $V_{reg}$ of the batteries. The DC-DC transformer 14 transforms (lowers) the voltage of the direct-current power output from the regulator rectifier 13 so as to supply the electric power to the batteries (the engine battery 3a and the accessory battery 3b) in a direction that the electric power is supplied. In other words, the charge voltage $V_{reg}$ of the batteries is lower than the voltage of the direct-current power output from the regulator rectifier 13. In some embodiments, the DC-DC transformer 14 transforms the voltage $V_{inv}$ of the direct-current power output from the regulator rectifier 13 so as to become equal to the charge voltage $V_{reg}$ of the batteries. The DC-DC transformer 14 is arranged inside the engine cover 112.

The controller 15 controls the outboard motor power generation system 100. Specifically, the controller 15 controls a thyristor of the regulator rectifier 13 to control the power generation amount of the power generator 12. The controller 15 controls the DC-DC transformer 14 according to the rotational speed of the engine 11 to control the voltage of the direct-current power output from the regulator rectifier 13. The controller 15 includes a CPU (central processing unit).

The controller 15 controls the voltage of the direct-current power output from the regulator rectifier 13 so as to be variable with respect to the induced voltage of the power generator 12. Specifically, the controller 15 controls the voltage of the direct-current power output from the regulator rectifier 13 so as to be raised relative to the induced voltage of the power generator 12 as the rotational speed of the engine 11 is increased.

More specifically, the controller 15 controls the voltage of the direct-current power output from the regulator rectifier 13 such that a ratio of the voltage of the direct-current power output from the regulator rectifier 13 to the induced voltage of the power generator 12 is increased as the rotational speed of the engine 11 is increased. When the rotational speed of the engine 11 is 600 rpm (idle speed), for example, the controller 15 controls the voltage of the direct-current power output from the regulator rectifier 13 such that the voltage value of the direct-current power output from the regulator rectifier 13 is about 50% of the voltage value of the induced voltage. When the rotational speed of the engine 11 is 1000 rpm, the controller 15 controls the voltage of the direct-current power output from the regulator rectifier 13 such that the voltage value of the direct-current power output from the regulator rectifier 13 is about 67% of the voltage value of the induced voltage. When the rotational speed of the engine 11 exceeds 1000 rpm, the controller 15 controls the voltage of the direct-current power output from the regulator rectifier 13 such that the voltage value of the direct-current power output from the regulator rectifier 13 is 100% of the voltage value of the induced voltage. In other words, the controller 15 controls the voltage value of the direct-current power output from the regulator rectifier 13 with respect to the induced voltage according to the rotational speed of the engine 11 such that the power generation amount is increased.

The electric pathway is branched downstream from the DC-DC transformer 14, and the electric power output from the DC-DC transformer 14 is supplied to each of the engine battery 3a and the accessory battery 3b. The engine accessory load group 16 is connected to the DC-DC transformer 14 and the engine battery 3a.

The accessory 21 includes electrical components such as an air conditioning of a cabin, a refrigerator, a water heater, an audio instrument, and an electric light. The power capacity of the accessory battery 3b is larger than that of the engine battery 3a.

The fuses 22 and 23 are disconnected so that no current flows therethrough when a current exceeding the rating flows. The fuse 22 is arranged between the DC-DC transformer 14 and the engine battery 3a. The fuse 23 is arranged between the DC-DC transformer 14 and the accessory battery 3b.

The engine battery 3a and the accessory battery 3b are arranged outside the engine cover 112 and can be charged with the electric power converted and supplied by the regulator rectifier 13. The engine battery 3a supplies electric power to the engine accessory load group 16 through the cable 31. The battery voltage of the engine battery 3a is about 12 V, for example. The accessory battery 3b supplies electric power to the accessory 21. The battery voltage of the accessory battery 3b is about 12 V, for example.

(Description of Increase in Power Generation Amount)

Figure 3:
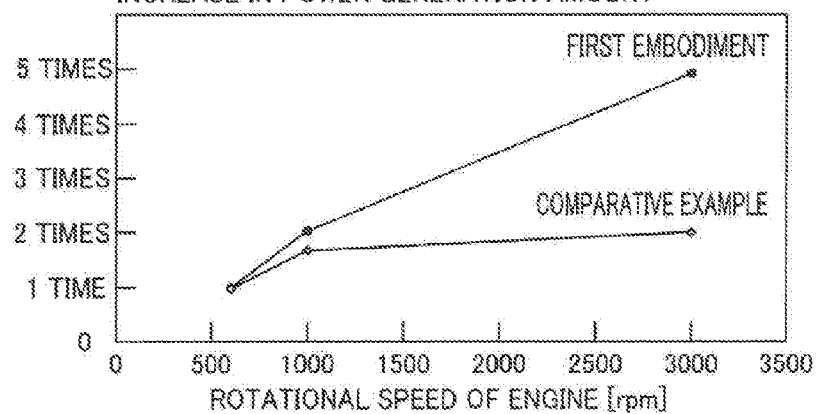
FIG. 3 is a graph for illustrating an increase in the power generation amount of the outboard motor power generation system according to the first embodiment of the present invention.

An increase in the power generation amount of the outboard motor power generation system 100 according to the first embodiment is now described with reference to FIG. 3.

In a comparative example, a conventional outboard motor power generation system provided with no DC-DC transformer 14 is used to generate electric power. In a graph shown in FIG. 3, a power generation amount of 600 rpm in the comparative example is used as a reference (one time).

In the outboard motor power generation system 100 according to the first embodiment, a power generation amount larger than the power generation amount of the outboard motor power generation system according to the comparative example is generated in a range of 600 rpm to 1000 rpm. In the comparative example, saturation of the power generation amount occurs when the rotational speed of the engine exceeds about 1000 rpm, and the power generation amount is substantially unchanged after the rotational speed of the engine exceeds 1000 rpm. According to the first embodiment, on the other hand, the power generation amount is further increased even after the rotational speed of the engine exceeds 1000 rpm.

(Effects of First Embodiment)

According to the first embodiment, the following effects are obtained.

According to the first embodiment, as hereinabove described, the outboard motor power generation system 100 is provided with the DC-DC transformer 14 arranged on the electric pathway between the regulator rectifier 13 and both the engine battery 3a and the accessory battery 3b, configured to raise the voltage of the direct-current power output from the regulator rectifier 13 relative to the charge voltage of the batteries. Thus, the voltage of the direct-current power output from the regulator rectifier 13 can be raised, and hence electric power capable of being drawn from the power generator 12 can be increased. Consequently, even when the rotational speed of the engine 11 is low, the power generation amount can be increased. Also when the rotational speed of the engine 11 is high, the voltage of the direct-current power output from the regulator rectifier 13 can be raised, and hence the power generation amount can be further increased.

According to the first embodiment, as hereinabove described, the outboard motor power generation system 100 is provided with the controller 15 configured to control the DC-DC transformer 14 according to the rotational speed of the engine 11 to control the voltage of the direct-current power output from the regulator rectifier 13. Thus, the voltage of the direct-current power output from the regulator rectifier 13 can be raised such that the power generation amount is maximized according to the rotational speed of the engine 11, and hence the power generation amount can be effectively increased.

According to the first embodiment, as hereinabove described, the DC-DC transformer 14 is arranged inside the engine cover 112. Thus, the DC-DC transformer 14 is arranged inside the engine cover 112 such that the outboard motor 1 has a compact structure.

According to the first embodiment, as hereinabove described, the electric pathway is branched downstream from the DC-DC transformer 14, and the electric power is supplied to each of the engine battery 3a and the accessory battery 3b. Thus, the electric power can be supplied to the accessory 21 provided in the outboard motor boat 10 by the accessory battery 3b, and the engine 11 can be driven by the engine battery 3a provided separately from the accessory battery 3b. Furthermore, even when the power consumption of the accessory battery 3b is increased with an increase in the size of the boat, the power generation amount can be increased, and hence the operation of the accessory 21 is not obstructed.

According to the first embodiment, as hereinabove described, the voltage of the direct-current power output from the regulator rectifier 13 is controlled so as to be variable with respect to the induced voltage of the power generator 12. Thus, the voltage of the direct-current power output from the regulator rectifier 13 can be raised such that the power generation amount is maximized according to the induced voltage, and hence the power generation amount can be effectively increased.

According to the first embodiment, as hereinabove described, the voltage of the direct-current power output from the regulator rectifier 13 is controlled so as to be raised relative to the induced voltage of the power generator 12 as the rotational speed of the engine 11 is increased. Thus, the voltage of the direct-current power output from the regulator rectifier 13 is raised according to the rotational speed of the engine 11 so that the power generation amount can be effectively increased.

According to the first embodiment, as hereinabove described, the voltage of the direct-current power output from the regulator rectifier 13 is controlled such that the ratio of the voltage of the direct-current power output from the regulator rectifier 13 to the induced voltage of the power generator 12 is increased as the rotational speed of the engine 11 is increased. Thus, the power generation amount can be more effectively increased in a region where the rotational speed of the engine 11 is high.

According to the first embodiment, as hereinabove described, the rotor 122 is provided integrally with the flywheel 113 connected to the crankshaft 111. Thus, the number of components can be reduced as compared with the case where the rotor 122 and the flywheel 113 are provided separately from each other.

According to the first embodiment, as hereinabove described, the rotor 122 is arranged above the engine 11 on the axis of the crankshaft 111. Thus, in the engine 11 of the outboard motor 1, the crankshaft 111 of which extends vertically, the rotation of the crankshaft 111 can be efficiently transmitted to the rotor 122 of the power generator 12.

Second Embodiment (Structure of Outboard Motor Power Generation System)

A second embodiment of the present invention is now described with reference to FIG. 4. In this second embodiment, a converter is provided, unlike the aforementioned first embodiment in which the regulator rectifier is provided. Portions similar to those of the outboard motor power generation system 100 according to the first embodiment are denoted by the same reference numerals.

Figure 4:
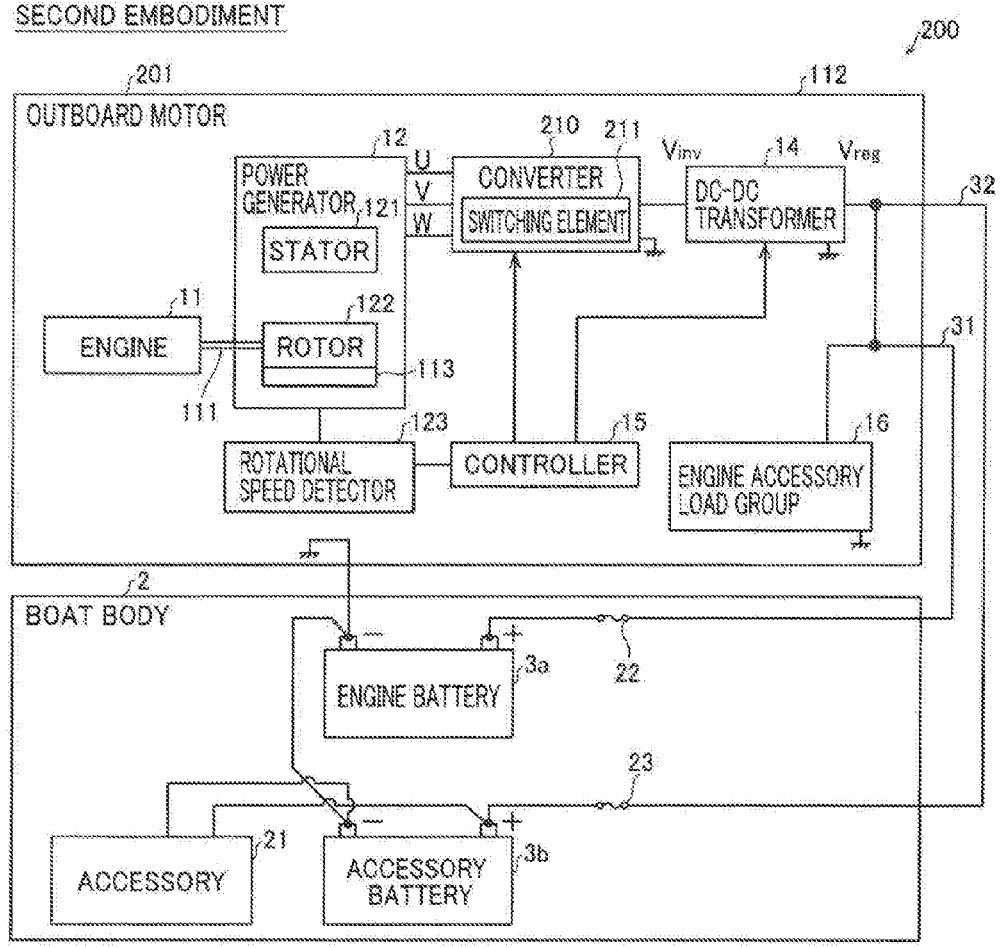
FIG. 4 is a block diagram schematically showing an outboard motor power generation system according to a second embodiment of the present invention.

An outboard motor 201 includes an engine 11, a power generator 12, a converter 210, a DC (direct current)-DC transformer 14, a controller 15, and an engine accessory load group 16, as shown in FIG. 4. An outboard motor power generation system 200 according to the second embodiment includes the engine 11, the power generator 12, the converter 210, an engine cover 112 (see FIG. 1), an engine battery 3a, an accessory battery 3b, and the DC-DC transformer 14. The converter 210 is an example of the "converting device" in the claims, and the DC-DC transformer 14 is an example of the "transformer" in the claims.

According to the second embodiment, the converter 210 includes a plurality of switching elements 211. The converter 210 converts alternating-current power output from the power generator 12 into direct-current power. The converter 210 switches the on-off timing of the plurality of switching elements 211 so as to convert the alternating-current power of three phases into the direct-current power. The converter 210 performs field control of the power generator 12 so as to allow the power generator 12 to efficiently generate electric power. Specifically, the controller 15 controls the converter 210 to advance and delay the timing (phase) of switching of the plurality of switching elements 211 so as to perform the field control of the power generator 12.

The controller 15 controls the DC-DC transformer 14 to control the voltage of the direct-current power output from the converter 210. Specifically, the controller 15 controls the voltage $V_{inv}$ of the direct-current power output from the converter 210 so as to become larger than the charge voltage $V_{reg}$ of the batteries. In other words, according to the second embodiment, in addition to controlling the voltage of the direct-current power output from the converter 210 so as to become larger than the charge voltage of the batteries, the field control of the power generator 12 is performed. In some embodiments, the controller 15 controls the voltage $V_{inv}$ of the direct-current power output from the converter 210 so as to be equal to the charge voltage $V_{reg}$ of the batteries.

The controller 15 controls the power generator 12 to generate electric power while controlling the converter 210 to control the power generator 12 in a field-strengthening direction. The controller 15 is configured to prioritize, of the field control and voltage control, each of which generates a predetermined power generation amount, the voltage control of raising the voltage of the direct-current power output from the converter 210 over the field control. In other words, when the field control and the voltage control are combined so as to adjust the power generation amount, the voltage value of the direct-current power output from the converter 210 is set to a maximum value in a possible range by the voltage control, and thereafter the power generation amount is adjusted by the field control.

The controller 15 controls the converter 210 to control power generation in a field-weakening direction when power generation of the power generator 12 is reduced. When the engine battery 3a and the accessory battery 3b are fully charged, for example, and a reduction in the power generation is required, the power generator 12 is controlled in the field-weakening direction so that the power generation is reduced.

(Description of Phase Control)

Figure 5:
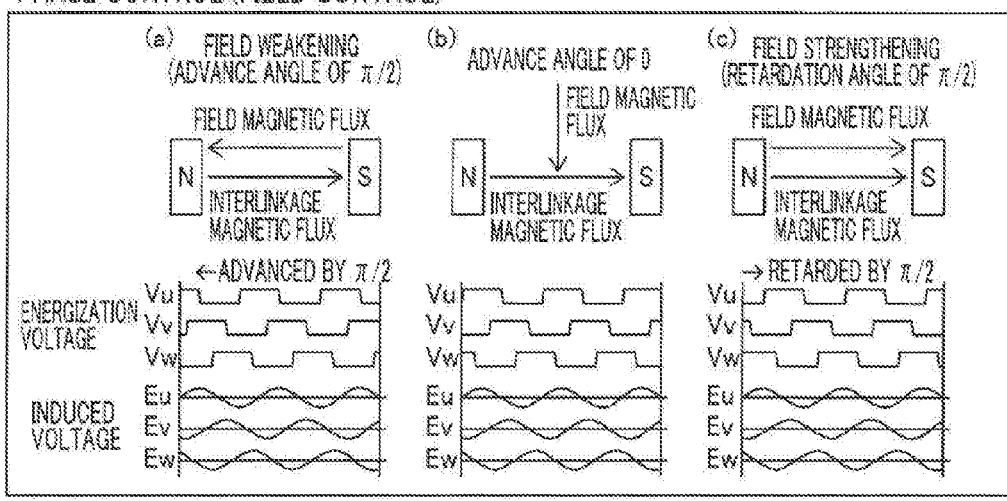
FIG. 5 illustrates phase control of the outboard motor power generation system according to the second embodiment of the present invention.

Phase control (field control) of the power generator 12 is now described with reference to FIG. 5.

The phase control is control of adjusting the phases of energization voltages (Vu, Vv, Vw) with respect to induced voltages (Eu, Ev, Ew). As shown in view (b) of FIG. 5, interlinkage magnetic flux and field magnetic flux are orthogonal to each other at an electric angle when the phases of the energization voltages agree with the phases of the induced voltages (when the advance angles are 0 degrees). In this case, the interlinkage magnetic flux is not influenced by the field magnetic flux, and hence the power generation amount is not changed. As shown in view (a) of FIG. 5, the interlinkage magnetic flux and the field magnetic flux are deviated by an angle of $\pi$ at the electric angle (face opposite directions) when the phases of the energization voltages are deviated by $\pi/2$ in the field-weakening direction with respect to the phases of the induced voltages (when the advance angles are $\pi/2$). In this case, the interlinkage magnetic flux is weakened, and hence the power generation amount is decreased. As shown in view (c) of FIG. 5, the interlinkage magnetic flux and the field magnetic flux face the same directions when the phases of the energization voltages are deviated by $\pi/2$ in the field-strengthening direction with respect to the phases of the induced voltages (when the retardation angles are $\pi/2$). In this case, the interlinkage magnetic flux is strengthened, and hence the power generation amount is increased. In other words, field-strengthening control is performed so as to increase the power generation amount, and field-weakening control is performed so as to decrease the power generation amount. The phase control is performed when the advance angles are at least $-\pi/2$ and not more than $\pi/2$. A direction in which the phases are advanced is referred to as the field-weakening direction, and a direction in which the phases are retarded is referred to as the field-strengthening direction.

(Changes in Power Generation Amount Due to Phase Control and Voltage Control)

Changes in the power generation amount due to the phase control and the voltage control are now described with reference to FIG. 6.

Figure 6:
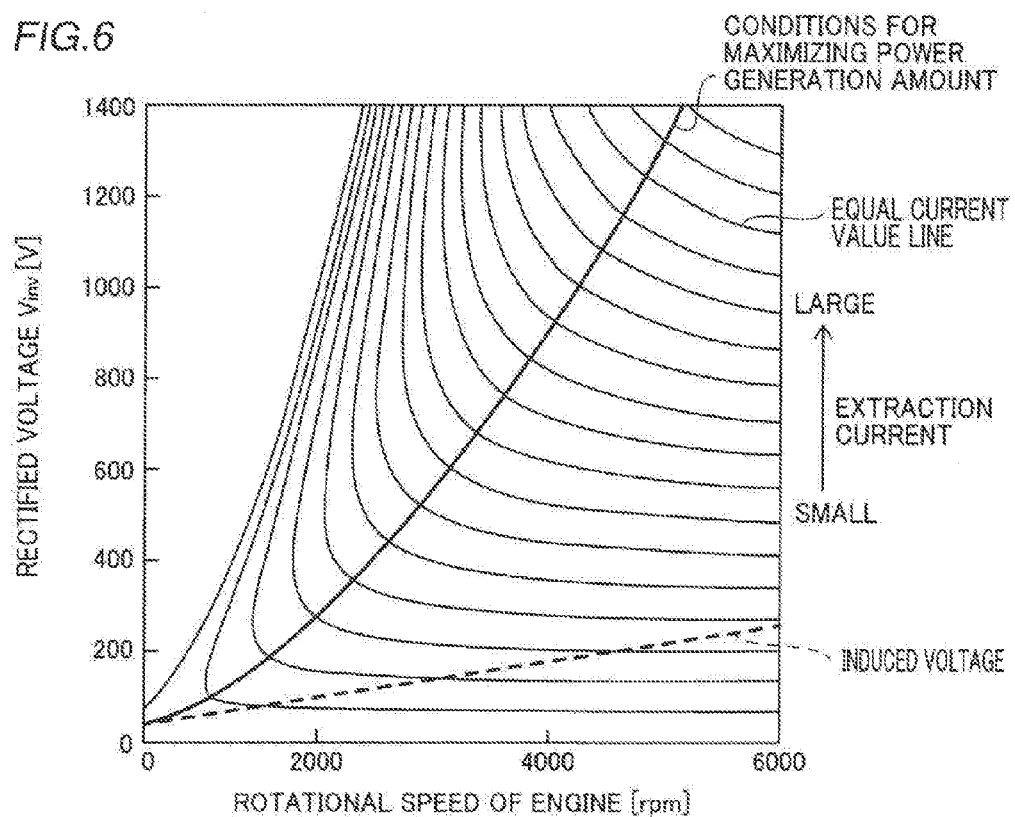
FIG. 6 is a graph showing an extraction current with respect to the rotational speed of an engine and a rectified voltage in the outboard motor power generation system according to the second embodiment of the present invention.

In an example shown in FIG. 6, a line in which the magnitudes of extraction currents are equal to each other is represented by an equal current value line. An extraction current is increased in magnitude as the rotational speed of the engine is increased so that a rectified voltage ($V_{inv}$), which is the voltage of the direct-current power output from the converter 210, is increased in value. The phase is set to a retardation angle of $\pi/2$ due to the field-strengthening control. Conditions for maximizing the power generation amount are to increase the rectified voltage with an increase in the rotational speed of the engine. In other words, the power generation amount can be effectively increased by increasing the rectified voltage along with the rotational speed of the engine.

(Description of Increase in Power Generation Amount)

Figure 7:
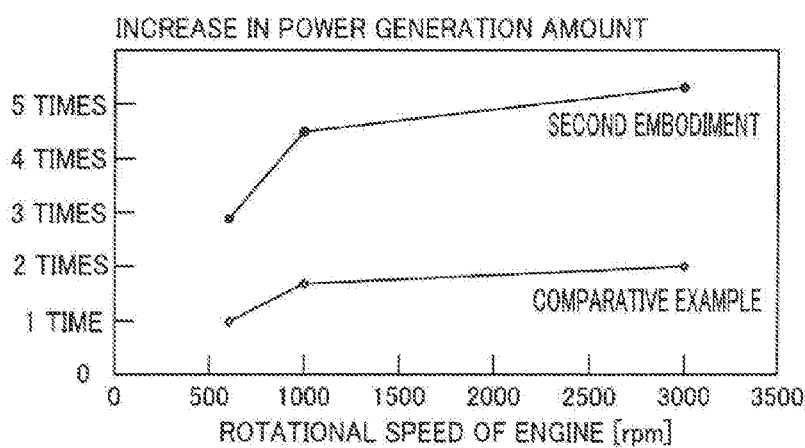
FIG. 7 is graph for illustrating an increase in the power generation amount of the outboard motor power generation system according to the second embodiment of the present invention.

An increase in the power generation amount of the outboard motor power generation system 200 according to the second embodiment is now described with reference to FIG. 7.

In the outboard motor power generation system 200 according to the second embodiment, a power generation amount is significantly increased relative to the power generation amount of an outboard motor power generation system according to a comparative example in a low rotation range of 600 rpm to 1000 rpm. Furthermore, according to the second embodiment, the power generation amount is further increased even after the rotational speed of the engine exceeds 1000 rpm.

The remaining structure of the second embodiment is similar to that of the aforementioned first embodiment.

(Effects of Second Embodiment)

According to the second embodiment, the following effects are obtained.

According to the second embodiment, as hereinabove described, the outboard motor power generation system 200 is provided with the DC-DC transformer 14 arranged on an electric pathway between the converter 210 and both the engine battery 3a and the accessory battery 3b, configured to raise the voltage of the direct-current power output from the converter 210 relative to the charge voltage of the batteries, similarly to the first embodiment. Thus, even when the rotational speed of the engine 11 is low, the power generation amount can be increased. Also when the rotational speed of the engine 11 is high, the power generation amount can be further increased.

According to the second embodiment, as hereinabove described, the converter 210 is configured to perform the phase control (field control) of the power generator 12, and the DC-DC is controlled so as to control the voltage of the direct-current power output from the converter 210. Thus, the field control of the power generator 12 is performed so that the voltage of the direct-current power output from the converter 210 can be efficiently raised. Furthermore, the DC-DC transformer 14 raises the voltage of the direct-current power output from the converter 210 so that the power generation amount can be efficiently increased with an increase in the voltage due to the field control.

According to the second embodiment, as hereinabove described, the power generator 12 is configured to generate electric power in a state where the converter 210 controls the power generator 12 in the field-strengthening direction. Thus, the field-strengthening control is performed such that the interlinkage magnetic flux can be reinforced by the field magnetic flux, and hence the power generation amount can be increased even when the rotational speed of the engine 11 is low.

According to the second embodiment, as hereinabove described, of the field control and the voltage control, each of which generates a predetermined power generation amount, the voltage control of raising the voltage of the direct-current power output from the converter 210 is prioritized over the field control. Thus, when the voltage control and the field control are combined, the voltage control of raising the voltage without an increase in power generation current is prioritized over the field control involving the increase in power generation current such that an excessive increase in power generation current can be significantly reduced or prevented. Thus, the power generation amount can be increased while heat generation of the power generator 12 due to the increase in current is significantly reduced or prevented.

According to the second embodiment, as hereinabove described, the converter 210 is configured to control power generation in the field-weakening direction when power generation of the power generator 12 is reduced. Thus, an excessive increase in coil current following the control in the field-strengthening direction can be significantly reduced or prevented, and hence heat generation of the power generator 12 due to an increase in coil current can be significantly reduced or prevented.

The remaining effects of the second embodiment are similar to those of the aforementioned first embodiment.

(Modification of Second Embodiment)

A modification of the second embodiment of the present invention is now described with reference to FIG. 8. In this modification of the second embodiment, an alternator 12a is provided instead of the power generator 12. Portions similar to those of the outboard motor power generation system 200 according to the second embodiment are denoted by the same reference numerals.

Figure 8:
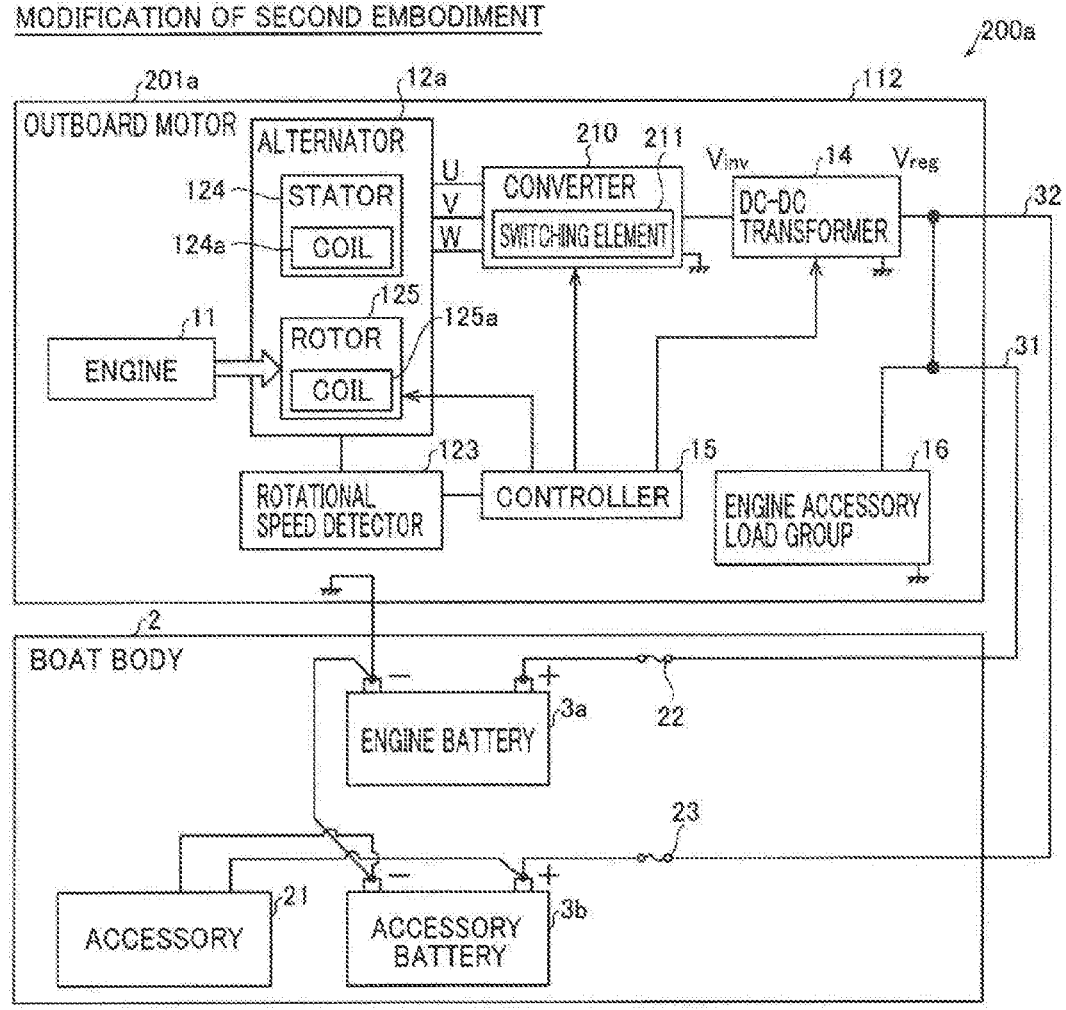
FIG. 8 is a block diagram schematically showing an outboard motor power generation system according to a modification of the second embodiment of the present invention.

An outboard motor 201a includes an engine 11, the alternator 12a, a converter 210, a DC (direct current)-DC transformer 14, a controller 15, and an engine accessory load group 16, as shown in FIG. 8. An outboard motor power generation system 200a includes the engine 11, the alternator 12a, the converter 210, an engine cover 112 (see FIG. 1), an engine battery 3a, an accessory battery 3b, and the DC-DC transformer 14. The alternator 12a is an example of the "power generator" in the claims. The converter 210 is an example of the "converting device" in the claims, and the DC-DC transformer 14 is an example of the "transformer" in the claims.

According to the modification of the second embodiment, the alternator 12a includes a stator 124 having a coil 124a and a rotor 125 having a coil 125a. In other words, in the alternator 12a, the coil 125a of the rotor 125 is energized such that the rotor 125 serves as an electromagnet, and the coil 124a of the stator 124 generates alternating-current power. The coil 125a of the rotor 125 has one phase. The rotor 124 is provided with a claw pole (not shown) to wrap the coil 125a. The claw pole includes claws that extend from the inside of the coil 125a in a radial direction and claws that extend from the outside of the coil 125a in the radial direction. The magnetic poles of the claws that extend from the inside and the claws that extend from the outside are different from each other such that the same magnetic pole structure as a structure obtained when magnets magnetized to a north pole and a south pole are alternately arranged is obtained.

The alternator 12a can adjust the output by changing the energization amount of the coil 125a of the rotor 125. More specifically, the alternator 12a can adjust the power generation amount by changing the energization amount of the coil 125a. In other words, the controller 15 controls the energization amount of the coil 125a of the rotor 125 so as to perform field control and adjust the power generation amount. Briefly, according to the modification of the second embodiment, the field control of the alternator 12a is performed in addition to controlling the voltage of direct-current power output from the converter 210 so as to be raised relative to the charge voltage of the batteries.

The remaining structure of the modification of the second embodiment is similar to that of the aforementioned second embodiment.

Third Embodiment (Structure of Outboard Motor Power Generation System)

A third embodiment of the present invention is now described with reference to FIG. 9. In this third embodiment, no DC-DC transformer is provided, unlike each of the aforementioned first and second embodiments in which the DC-DC transformer is provided. Portions similar to those of the outboard motor power generation system 200 according to the second embodiment are denoted by the same reference numerals.

Figure 9:
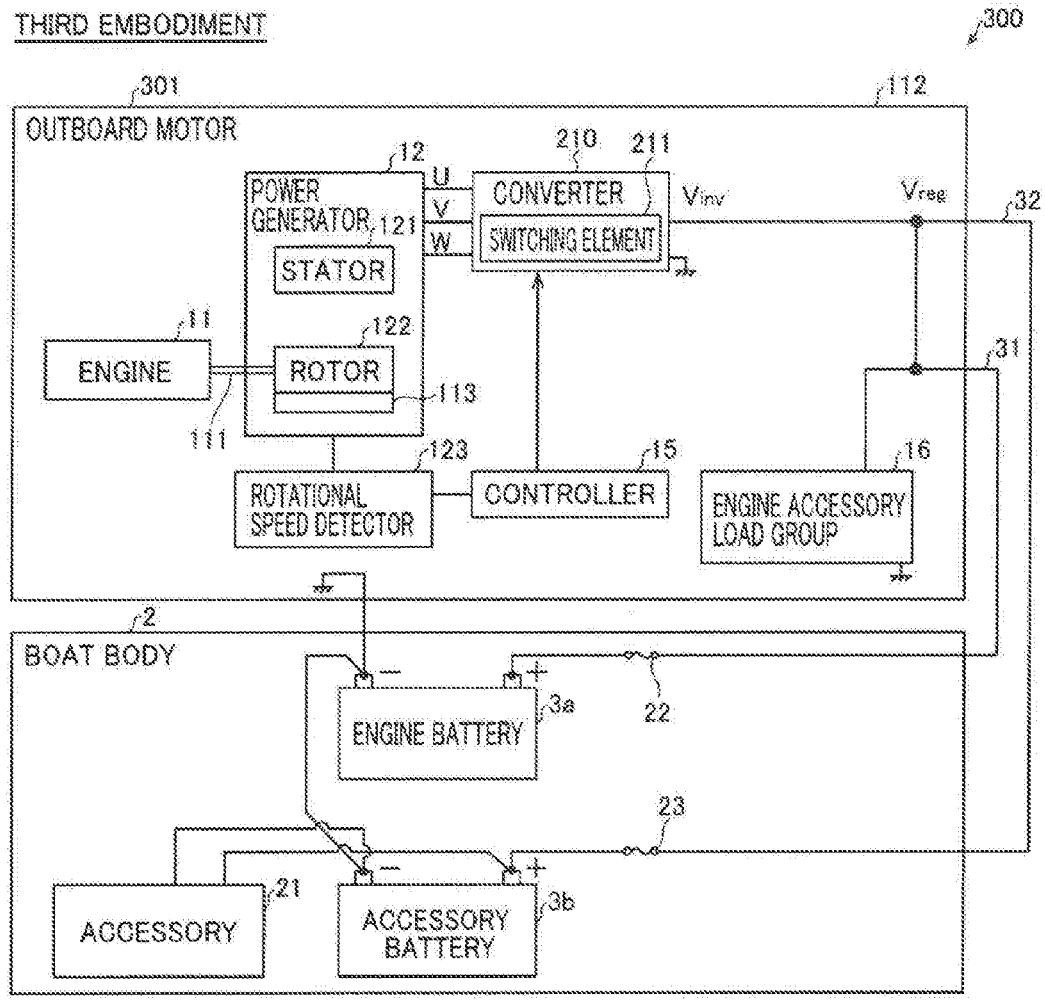
FIG. 9 is a block diagram schematically showing an outboard motor power generation system according to a third embodiment of the present invention.

An outboard motor 301 includes an engine 11, a power generator 12, a converter 210, a controller 15, and an engine accessory load group 16, as shown in FIG. 9. An outboard motor power generation system 300 according to the third embodiment includes the engine 11, the power generator 12, the converter 210, an engine cover 112 (see FIG. 1), an engine battery 3a, and an accessory battery 3b. The converter 210 is an example of the "converting device" in the claims.

According to the third embodiment, the converter 210 includes a plurality of switching elements 211. The converter 210 performs phase control of the power generator 12 so as to allow the power generator 12 to efficiently generate electric power. Specifically, the controller 15 controls the converter 210 to advance and delay the timing (phase) of switching of the plurality of switching elements 211 so as to perform field control of the power generator 12. In other words, the converter 210 performs the phase control of the power generator 12 in a field-strengthening direction so as to control power generation.

According to the third embodiment, the engine battery 3a and the accessory battery 3b are charged with direct-current power output from the converter 210. In other words, the voltage $V_{inv}$ of the direct-current power into which the converter 210 converts alternating-current power is substantially equal in value to the charge voltage $V_{reg}$ of the batteries.

(Description of Increase in Power Generation Amount)

Figure 10:
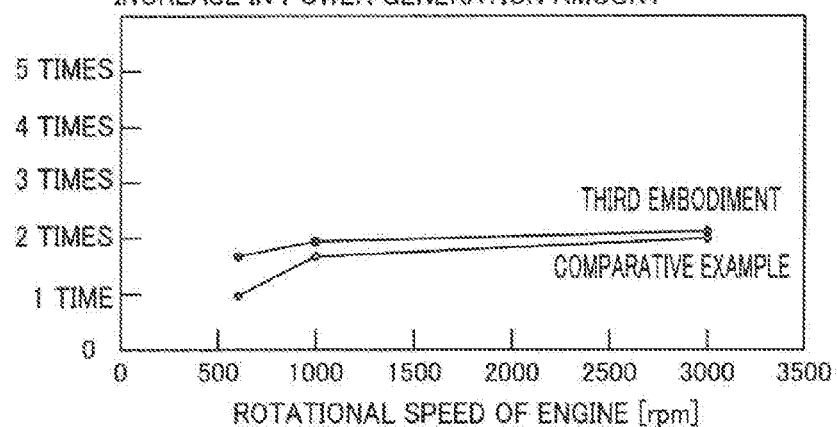
FIG. 10 is graph for illustrating an increase in the power generation amount of the outboard motor power generation system according to the third embodiment of the present invention.

An increase in the power generation amount of the outboard motor power generation system 300 according to the third embodiment is now described with reference to FIG. 10.

In the outboard motor power generation system 300 according to the third embodiment, a power generation amount larger than the power generation amount of an outboard motor power generation system according to a comparative example is generated over a range from a low rotation region to a high rotation region. The power generation amount is increased relative to the power generation amount of the outboard motor power generation system according to the comparative example particularly in the low rotation region of 600 rpm to 1000 rpm.

The remaining structure of the third embodiment is similar to that of the aforementioned second embodiment.

(Effects of Third Embodiment)

According to the third embodiment, the following effects are obtained.

According to the third embodiment, as hereinabove described, the converter 210 is configured to perform the phase control of the power generator 12 in the field-strengthening direction so as to control power generation. Thus, field-strengthening control is performed such that interlinkage magnetic flux can be reinforced by field magnetic flux, and hence the power generation amount can be increased even when the rotational speed of the engine 11 is low. Also when the rotational speed of the engine 11 is high, the power generation amount can be further increased by the field-strengthening control.

The remaining effects of the third embodiment are similar to those of the aforementioned first embodiment.

(Modification)

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the DC-DC transformer serving as the transformer according to the present invention is arranged inside the engine cover of the outboard motor in each of the aforementioned first and second embodiments, the present invention is not restricted to this. According to the present invention, the transformer may alternatively be arranged outside the engine cover of the outboard motor. For example, the transformer may be arranged in the boat body on the electric pathway between the converting device and the barriers.

While the regulator rectifier is used as the converting device according to the present invention in the aforementioned first embodiment and the converter is used as the converting device according to the present invention in each of the second and third embodiments, the present invention is not restricted to this. According to the present invention, a converting device configured to convert alternating-current power into direct-current power other than the regulator rectifier and the converter may alternatively be used as the converting device.

While the rotor (power generator) is arranged above the engine on the axis of the crankshaft in each of the aforementioned first to third embodiments, the present invention is not restricted to this. According to the present invention, the rotor (power generator) may alternatively be arranged below the engine on the axis of the crankshaft. Furthermore, the rotor may alternatively be arranged away from the crankshaft, and the power of the crankshaft may alternatively be transmitted to the rotor through a drive belt, a chain, a gear, or the like.

While a plurality of batteries including the engine battery and the accessory battery are provided in the outboard motor power generation system in each of the aforementioned first and second embodiments, the present invention is not restricted to this. According to the present invention, one battery may alternatively be provided in the outboard motor power generation system.

While one outboard motor is provided in each of the aforementioned first to third embodiments, the present invention is not restricted to this. According to the present invention, two or more outboard motors may alternatively be provided. In this case, an engine battery may be provided for each of the two or more outboard motors.

While the power generator is used to generate electric power in each of the aforementioned first to third embodiments, the present invention is not restricted to this. According to the present invention, the power generator may alternatively be used as a motor in addition to being used to generate electric power. For example, the power generator may be energized such that the power generator is used as a starter motor or a motor configured to assist the starter motor.

What is claimed is:

1. An outboard motor power generation system comprising:
    an engine including a crankshaft;
    a power generator including
        a stator, and
        a rotor driven by the crankshaft;
    a converting device configured to convert alternating-current power output from the power generator into direct-current power and outputs the direct-current power;
    an engine cover configured to cover the engine, the power generator, and the converting device;
    a battery arranged outside the engine cover and capable of being charged with electric power converted and supplied by the converting device, the battery being connected to the converting device through an electric pathway, the battery having a charge voltage at which the battery is chargeable; and
    a transformer provided on the electric pathway, and configured to raise a voltage of the direct-current power to be output from the converting device so that the voltage of the direct-current power to be output from the converting device becomes high relative to the charge voltage of the battery.

2. The outboard motor power generation system according to claim 1, further comprising a controller configured to control the transformer according to a rotational speed of the engine so as to control the voltage of the direct-current power output from the converting device.

3. The outboard motor power generation system according to claim 1, wherein the transformer is arranged inside the engine cover.

4. The outboard motor power generation system according to claim 1, wherein
    the battery includes an engine battery and an accessory battery, and
    the electric pathway is branched downstream from the transformer, and the direct-current power output from the transformer is supplied to each of the engine battery and the accessory battery through the branched electric pathway.

5. The outboard motor power generation system according to claim 1, wherein the converting device includes a regulator rectifier.

6. The outboard motor power generation system according to claim 1, wherein
    the converting device includes a plurality of switching elements,
    the converting device is configured to control the power generator, and
    the outboard motor power generation system further comprises a controller configured to control the transformer such that the voltage of the direct-current power output from the converting device is controlled.

7. The outboard motor power generation system according to claim 6, wherein the controller is configured to control the power generator to generate the alternating-current power while the controller controls the converting device to control the power generator in a field-strengthening direction.

8. The outboard motor power generation system according to claim 6, wherein the controller controls field control of the power generator and voltage control, each of which generates a predetermined power generation amount, the voltage control including controlling the raising the voltage of the direct-current power output from the converting device by the transformer, the controller prioritizing the voltage control over the field control.

9. The outboard motor power generation system according to claim 6, wherein the controller is configured to control the converting device to control power generation by the power generator in a field-weakening direction when a reduction in the power generation of the power generator is required.

10. The outboard motor power generation system according to claim 1, further comprising a controller configured to control the voltage of the direct-current power output from the converting device to be variable with respect to an induced voltage of the power generator.

11. The outboard motor power generation system according to claim 10, wherein the controller is configured to control the voltage of the direct-current power output from the converting device to be raised relative to the induced voltage of the power generator as a rotational speed of the engine is increased.

12. The outboard motor power generation system according to claim 11, wherein the controller is configured to control the voltage of the direct-current power output from the converting device such that a ratio of the voltage of the direct-current power output from the converting device to the induced voltage of the power generator is increased as the rotational speed of the engine is increased.

13. An outboard motor comprising:
an engine including a crankshaft;
a power generator including
a stator, and
a rotor driven by the crankshaft;
a converting device configured to convert alternating-current power output from the power generator into direct-current power and including a plurality of switching elements, the converting device further being capable of performing phase control;
an engine cover configured to cover the engine, the power generator, and the converting device; and
a controller configured to control the converting device to perform the phase control of the power generator in a field-strengthening direction so as to control power generation.

14. The outboard motor according to claim 13, wherein the rotor includes a flywheel connected to the crankshaft.

15. The outboard motor according to claim 14, wherein the rotor is arranged above or below the engine on an axis of the crankshaft.

* * * * *